(12) United States Patent
Chang et al.

(10) Patent No.: US 11,193,871 B2
(45) Date of Patent: Dec. 7, 2021

(54) APPARATUS AND METHOD FOR MEASURING PARTICULATE MATTER

(71) Applicant: SAMSUNG ELECTRONICS CO., LTD., Suwon-si (KR)

(72) Inventors: Ho Jun Chang, Seoul (KR); Yun S Park, Suwon-si (KR); Woo Chang Lee, Anyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 33 days.

(21) Appl. No.: 16/819,643

(22) Filed: Mar. 16, 2020

(65) Prior Publication Data

US 2021/0025802 A1    Jan. 28, 2021

(30) Foreign Application Priority Data

Jul. 24, 2019 (KR) .................. 10-2019-0089673

(51) Int. Cl.
*G01N 15/02* (2006.01)
*G01N 15/06* (2006.01)
*G01N 15/00* (2006.01)

(52) U.S. Cl.
CPC ......... *G01N 15/0211* (2013.01); *G01N 15/06* (2013.01); *G01N 2015/0096* (2013.01)

(58) Field of Classification Search
CPC ........... G01N 15/0211; G01N 15/0227; G01N 15/06; G01N 2015/0046;
(Continued)

(56) References Cited

U.S. PATENT DOCUMENTS 3,786,261 A * 1/1974 Tucker .................. G06M 1/101
250/205
5,841,534 A * 11/1998 Lorenz ............... G01N 15/0205
356/336
(Continued)

FOREIGN PATENT DOCUMENTS

DE  20-2015-000820 U1   3/2015
EP         0992785 A2   4/2000
(Continued)

OTHER PUBLICATIONS

Etzion et al., "Night-Time Ground Hyperspectral Imaging for Urban-Scale Remote Sensing of Ambient PM. I. Aerosol Optical Thickness Acquisition", Aerosol Science and Technology, 46, Jun. 27, 2012, pp. 1119-1128, 11 pages total.
(Continued)

*Primary Examiner* — Tri T Ton
(74) *Attorney, Agent, or Firm* — Sughrue Mion, PLLC (57) ABSTRACT

Provided is an apparatus for measuring particulate matter, the apparatus including an air inflow device configured to receive air including particulate matter particles, two or more light sources configured to respectively emit light of different wavelengths to the air received, a pattern measuring device configured to measure scattering patterns for each wavelength of light based on detecting light that is forward-scattered by the particulate matter particles and light that is back-scattered by the particulate matter particles, and a processor configured to obtain a size of the particulate matter particles and a concentration of the particulate matter particles based on the scattering patterns for each wavelength of light.

30 Claims, 8 Drawing Sheets

(58) Field of Classification Search
CPC ... G01N 2015/0096; G01N 2015/0277; G01N 2015/0693; G01N 2021/4707; G01N 2021/4709; G01N 21/53
See application file for complete search history.

(56) References Cited

U.S. PATENT DOCUMENTS

| | | | |
|---|---|---|---|
| 6,177,994 B1 | 1/2001 | Watson et al. | |
| 9,541,501 B2 | 1/2017 | Allemann et al. | |
| 10,142,030 B1* | 11/2018 | Blanks | H04B 10/541 |
| 2003/0016356 A1 | 1/2003 | Adachi et al. | |
| 2008/0297360 A1* | 12/2008 | Knox | G01S 7/4873 |
| | | | 340/628 |
| 2009/0122313 A1 | 5/2009 | Jones et al. | |
| 2016/0320284 A1 | 11/2016 | Spriggs | |
| 2016/0343226 A1* | 11/2016 | Fischer | G08B 17/107 |
| 2017/0046936 A1* | 2/2017 | Aebersold | H01L 31/147 |
| 2018/0011018 A1 | 1/2018 | Kim et al. | |
| 2018/0348086 A1 | 12/2018 | Ahn | |
| 2019/0234862 A1* | 8/2019 | Schladitz | G01N 21/49 |

FOREIGN PATENT DOCUMENTS

| | | |
|---|---|---|
| KR | 10-2017-0042076 A | 4/2017 |
| KR | 10-2017-0136885 A | 12/2017 |
| KR | 10-1825161 B1 | 2/2018 |
| KR | 10-1853104 B1 | 4/2018 |
| KR | 10-2018-0067188 A | 6/2018 |
| KR | 10-2018-0076195 A | 7/2018 |
| KR | 10-2019-0023789 A | 3/2019 |

OTHER PUBLICATIONS

Communication dated Nov. 9, 2020, from the European Patent Office in counterpart European Application No. 20171459.9.

* cited by examiner

Long λ forward

Long λ backward

Short λ forward

Short λ backward

APPARATUS AND METHOD FOR MEASURING PARTICULATE MATTER

CROSS-REFERENCE TO RELATED APPLICATION

This application claims priority from Korean Patent Application No. 10-2019-0089673, filed on Jul. 24, 2019, in the Korean Intellectual Property Office, the entire disclosure of which is incorporated herein by reference.

BACKGROUND

1. Field

Example embodiments of the present disclosure relate to technology for measuring particulate matter.

2. Description of Related Art

Particulate matter refers to very small particles and liquid droplets suspended in the air, which are so small that they are not visible to the eye. Particulate matter may include particles having a diameter of 10 μm or less, which are emitted from combustion of fossil fuels, such as coal, oil, and the like, or exhaust gases from cars, factories, and the like.

Recently, particulate matter has become a serious threat to both human health and the environment. Long-time exposure to particulate matter can lead to a significant decrease in the level of immunity, causing various health problems including respiratory diseases, such as cold, asthma, bronchitis, and the like, as well as cardiovascular diseases, skin diseases, eye problems, and the like. Particularly, fine particulate matter having a diameter of 2.5 μm or less tends to penetrate deep into the lungs and the bronchial tubes in the body, and sticks to the lungs and the bronchial tubes which may cause various diseases.

Accordingly, there is a need for techniques that make it possible to more easily measure the quality of indoor air for individuals or home users by using a small measuring device for measuring the quality of air surrounding the users.

SUMMARY

One or more example embodiments provide an apparatus for measuring particulate matter.

According to an aspect of an example embodiment, there is provided an apparatus for measuring particulate matter, the apparatus including an air inflow device configured to receive air including particulate matter particles, two or more light sources configured to respectively emit light of different wavelengths to the air received, a pattern measuring device configured to measure scattering patterns for each wavelength of light based on detecting light that is forward-scattered by the particulate matter particles and light that is back-scattered by the particulate matter particles, and a processor configured to obtain a size of the particulate matter particles and a concentration of the particulate matter particles based on the scattering patterns for each wavelength of light.

The processor may be further configured to obtain the size of the particulate matter particles and the concentration of the particulate matter particles based on a particulate matter estimation model that defines the size of the particulate matter particles and the concentration of the particulate matter particles that corresponds to the scattering patterns for each wavelength of light.

The two or more light sources may include a first light source configured to emit first light in a near-infrared wavelength band, and a second light source configured to emit second light in an infrared wavelength band or a visible wavelength band.

The pattern measuring device may include a first detector configured to detect the back-scattered light, and a second detector configured to detect the forward-scattered light.

Each of the first detector and the second detector may be configured to detect light of two or more wavelengths.

Each of the first detector and the second detector may be a multispectral light receiving device or hyperspectral light receiving device.

Each of the first detector and the second detector may be a light receiving device made of a wide band gap material.

The first detector and the second detector may be disposed to face each other.

The two or more light sources may be disposed at a center of the first detector.

The second detector may include an outlet through which light transmitted through the air exits.

The processor may be configured to generate a histogram, indicating a concentration for each particle size, based on the obtained size of the particulate matter particles and the concentration of the particulate matter particles.

The processor may be configured to provide a warning to a user through an output interface based on the concentration of the particulate matter particles exceeding a threshold.

The apparatus may further include a display configured to display the size of the particles of particulate matter and the concentration of the particles of particulate matter.

According to another aspect of an example embodiment, there is provided a method of measuring particulate matter, the method including emitting two or more light beams having different wavelengths to air including particulate matter particles, measuring scattering patterns for each wavelength of light based on detecting light that is forward-scattered by the particulate matter particles and light that is back-scattered by the particulate matter particles, and determining a size of the particulate matter particles and a concentration of the particulate matter particles based on the scattering patterns measured for each wavelength of light.

The determining of the size of the particulate matter particles and the concentration of the particulate matter particles may include determining the size of the particulate matter particles and the concentration of the particles of particulate matter based on a particulate matter estimation model that defines the size of the particulate matter particles and the concentration of the particulate matter particles that corresponds to the scattering patterns for each wavelength of light.

The two or more light beams having different wavelengths may include first light in a near-infrared wavelength band, and second light in an infrared wavelength band or a visible wavelength band.

The measuring of the scattering patterns for each wavelength of light may include detecting the back-scattered light including two or more wavelengths of light by a first detector, and detecting the forward-scattered light including two or more wavelengths of light by a second detector.

Each of the first detector and the second detector may be a multispectral light receiving device or hyperspectral light receiving device.

Each of the first detector and the second detector may be a light receiving device made of a wide band gap material.

The first detector and the second detector may be disposed to face each other.

The method may further include generating a histogram, indicating a concentration for each particle size, based on the size of the particulate matter particles and the concentration of the particulate matter particles.

The method may further include providing a warning to a user based on a concentration of the particulate matter particles exceeding a threshold.

According to another aspect of an example embodiment, there is provided an apparatus for measuring particulate matter, the apparatus including a first light source configured to emit first light in a first wavelength band to air including particulate matter particles, a second light source configured to emit second light in a second wavelength band to the air including the particulate matter particles, a first detector configured to measure a back scattering pattern for each wavelength of light by detecting the first light that is back-scattered by the particulate matter particles and the second light that is back-scattered by the particulate matter particles, a second detector configured to measure a forward scattering pattern for each wavelength of light by detecting the first light forward-scattered by the particulate matter particles and the second light that is forward-scattered by the particulate matter particles, and a processor configured to determine a size of the particulate matter particles and a concentration of the particulate matter particles based on the back scattering pattern for each wavelength of light and the forward scattering pattern for each wavelength of light.

The processor may be further configured to determine the size of the particulate matter particles and the concentration of the particulate matter particles based on a particulate matter estimation model that defines the size of the particulate matter particles and the concentration of the particulate matter particles that corresponds to the back scattering pattern for each wavelength of light and the forward scattering pattern for each wavelength of light.

The first wavelength band may be a near-infrared wavelength band, and the second wavelength band may be an infrared wavelength band or a visible wavelength band.

Each of the first detector and the second detector may be a multispectral light receiving device or hyperspectral light receiving device.

Each of the first detector and the second detector may be a light receiving device made of a wide band gap material.

The first detector and the second detector may be disposed to face each other.

The second detector may further include an outlet through which light transmitted through the air exits.

The processor may be further configured to generate a histogram, indicating a concentration for each particle size, based on the determined size of the particulate matter particles and the determined concentration of the particulate matter particles.

The processor may be configured to provide a warning to a user based on a concentration of the particulate matter particles exceeding a threshold

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Hereinafter, example embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

Process steps described herein may be performed differently from a specified order, unless a specified order is clearly stated in the context of the disclosure. That is, each step may be performed in a specified order, at substantially the same time, or in a reverse order.

Further, the terms used throughout this specification are defined in consideration of the functions according to example embodiments, and can be varied according to a purpose of a user or manager, or precedent and so on. Therefore, definitions of the terms should be made on the basis of the overall context.

It will be understood that, although the terms first, second, etc. may be used herein to describe various elements, these elements should not be limited by these terms. These terms are only used to distinguish one element from another. Any references to singular may include plural unless expressly stated otherwise. It should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, components that will be described in the specification are discriminated merely according to functions mainly performed by the components. That is, two or more components which will be described later can be integrated into a single component. Furthermore, a single component which will be explained later can be separated into two or more components. Moreover, each component can additionally perform some or all of a function executed by another component in addition to the main function thereof. Some or all of the main function of each component can be carried out by another component. Each component may be implemented as hardware, software, or a combination of both.

Figure 1:
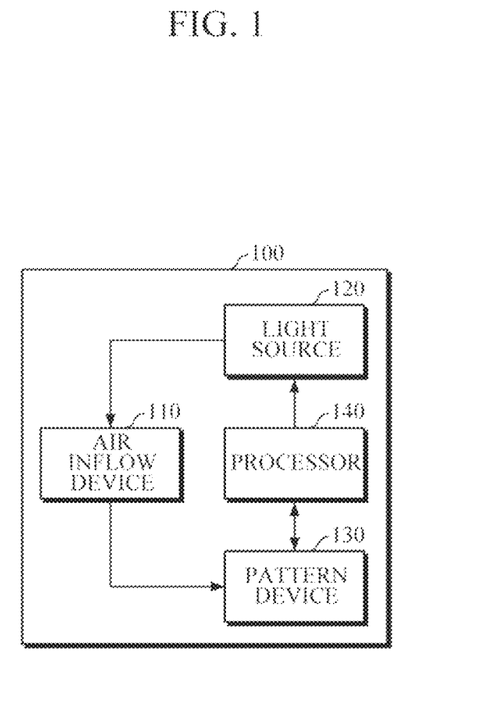
FIG. 1 is a block diagram illustrating an example of an apparatus for measuring particulate matter according to an example embodiment.
Figure 2:
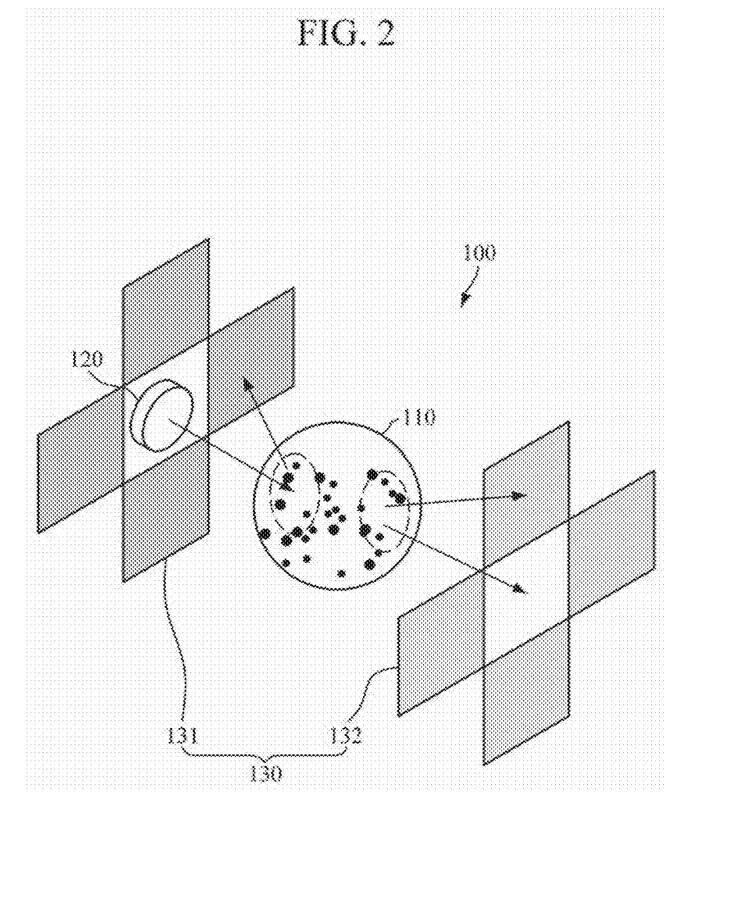
FIG. 2 is a diagram illustrating an example of a structure of an apparatus for measuring particulate matter according to an example embodiment
Figure 3:
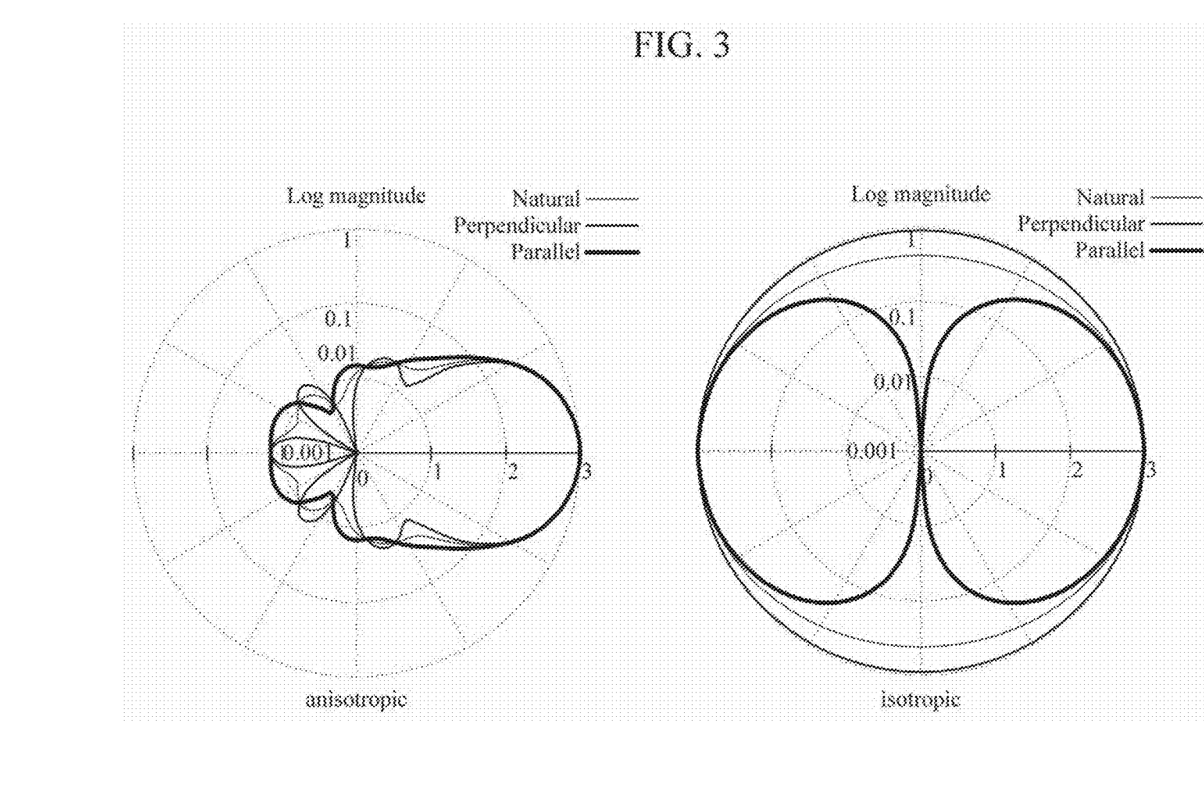
FIG. 3 is a diagram explaining an example of Rayleigh scattering and Mie scattering.
Figure 4:
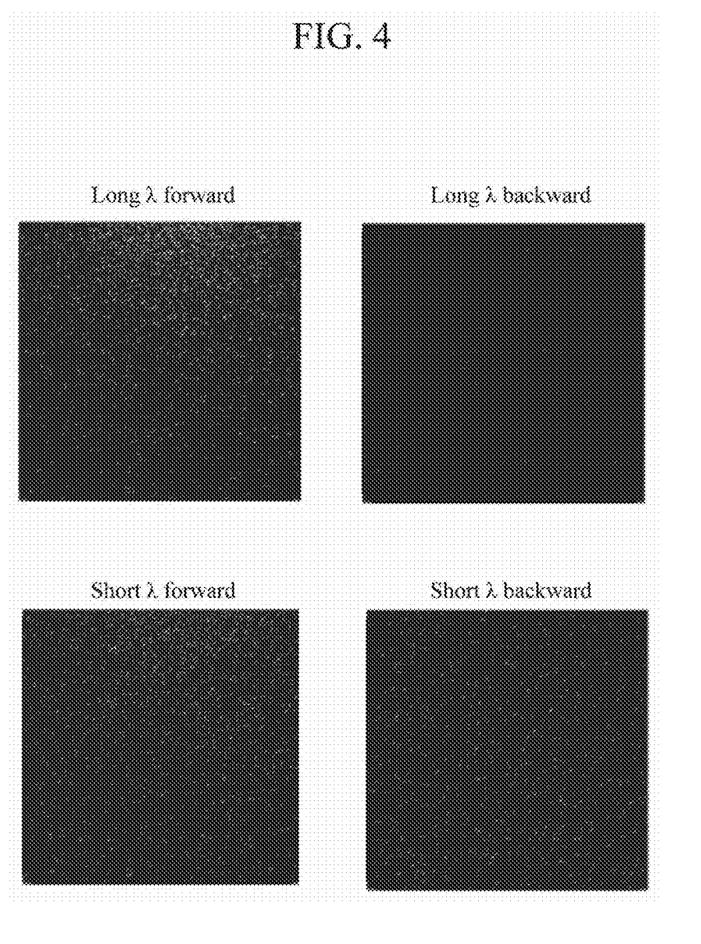
FIG. 4 is a diagram illustrating scattering patterns measured for each wavelength according to an example embodiment.

FIG. 1 is a block diagram illustrating an example of an apparatus for measuring particulate matter according to an example embodiment. FIG. 2 is a diagram illustrating an example of a structure of an apparatus for measuring particulate matter according to an example embodiment. FIG. 3 is a diagram explaining an example of Rayleigh scattering and Mie scattering. FIG. 4 is a diagram illustrating scattering patterns measured for each wavelength according to an example embodiment.

Referring to FIGS. 1 and 2, the apparatus 100 for measuring particulate matter includes an air inflow device 110, a light source 120, a pattern measuring device 130, and a processor 140.

The air inflow device 110 includes an inlet and an outlet, and may introduce air containing particulate matter through the inlet and may discharge the air through the outlet. In order to prevent the particulate matter from being adsorbed onto the surface of the air inflow device 110, the inside of the air inflow device 110 may be coated, for example, through hydrophobic coating. Further, the air inflow device 110 may be provided in a detachable manner in the apparatus 100 for measuring particulate matter. In an example embodiment, the air inflow device 110 may be formed as a transparent window, a transparent pipe, and the like.

The light source 120 may emit two or more light beams, having different wavelengths, to the air containing particulate matter introduced into the air inflow device 110. The light source 120 may include two or more light sources which emit light having wavelengths in different wavelength bands. In this case, the different wavelength bands may be separated from each other by a sufficient wavelength spacing, such that various sizes of particulate matter may be measured, and the wavelength bands may be a near-infrared wavelength band, a visible wavelength band, and an infrared wavelength band. For example, when the light source 120 includes two light sources, a first light source and a second light source, the first light source may emit light of first light having a wavelength in a near-infrared wavelength band, and the second light source may emit second light having a wavelength in an infrared wavelength band or a visible wavelength band. In this case, the first light may be light having a wavelength of 0.405 μm, and the second light may be light having a wavelength of 0.85 μm. However, embodiments are not limited thereto.

Each light source of the light source 120 may include a light emitting diode (LED), a laser diode, and the like, but embodiments are not limited thereto. Further, each light source is not necessarily formed of a single light source, and may be formed of an array of a plurality of light sources. In the case where each light source is formed of an array of a plurality of light sources, the plurality of light sources may emit light of different wavelengths, or may emit light of the same wavelength.

In an example embodiment, the light source 120 may further include a filter, for example, a cleanup filter, a bandpass filter, and the line, for selecting light of a specific wavelength, and/or an optical element, for example, a reflection mirror, and the like, for adjusting a direction of light emitted by the light source 120, and the like.

The pattern measuring device 130 may measure scattering patterns for each wavelength of light by detecting light forward-scattered and back-scattered by particles of particulate matter.

Light scattering by particles may vary depending on the wavelength of light and the size of particles. For example, Rayleigh scattering occurs when the particle size is much smaller than the wavelength of light, and Mie scattering occurs when the particle size is similar to or greater than the wavelength of light.

Referring to FIG. 3, Mie scattering is an anisotropic scattering as shown on the left, and Rayleigh scattering is an isotropic scattering as shown on the right. That is, in Rayleigh scattering, light is scattered in all directions, and in Mie scattering, light is scattered forward, in the direction the light travels. Further, as the size of the particles increases, these characteristics of light scattering may be more clearly observed. In Rayleigh scattering, the intensity of the scattered light is inversely proportional to the wavelength to the fourth power. Accordingly, the scattering becomes more intense at shorter wavelengths. In Mie scattering, the intensity of the scattered light is not inversely proportional to the wavelength to the fourth power, and isotropy is broken, such that scattering may occur significantly in a specific direction.

For example, if light of two wavelengths is emitted to air containing a high concentration of particles of a relatively large size, it can be seen that anisotropic Mie scattering occurs at both of the two wavelengths, and scattering patterns are generated, which are concentrated at a specific region, as illustrated in FIG. 4.

As isotropic Rayleigh scattering and anisotropic Mie scattering occur depending on the light wavelength and the particle size, the size of particles causing scattering may be estimated by analyzing such scattering patterns, which will be described below.

The pattern measuring device 130 may include a first detector 131 which measures a back-scattering pattern for each wavelength by detecting light back-scattered by particles of particulate matter, and a second detector 132 which measures a forward-scattering pattern for each wavelength by detecting light forward-scattered by particles of particulate matter. Each of the first detector 131 and the second detector 132 may detect light of two or more wavelengths. To this end, each of the first detector 131 and the second detector 132 may be implemented as a multispectral or hyperspectral light receiving device, or may be implemented as a multispectral sensor which may be formed as a light receiving device made of a wide band gap material. Each of the first detector 131 and the second detector 132 may include a photo diode, a photo transistor (PTr), an image sensor including a charge-coupled device (CCD), a complementary metal-oxide semiconductor (CMOS), etc.), and the like.

In an example embodiment, the first detector 131 and the second detector 132 may be disposed to face each other as illustrated in FIG. 2. Further, the light source 120 may be disposed at the center of the first detector 131, and an outlet, through which the transmitted light exits, may be disposed at the center of the second detector 132.

Further, in an example embodiment, in order to prevent or reduce the light source 120 from directly emitting light to the first detector 131 and the second detector 132, the light source 120, the first detector 131, and the second detector 132 may include a structure such as a baffle, or the like.

The number of light sources of the light source 120 may be the same as or different from the number of wavelengths which may be detected by the first detector 131 and the second detector 132. For example, the light source 120 may include two light sources, but the first detector 131 and the second detector 132 may detect three wavelengths. That is, when the light source of the light source 120 emits light in a specific wavelength band, rather than light of a specific wavelength, the first detector 131 and the second detector 132 may detect light of different wavelengths in the specific wavelength band.

The processor 140 may control the overall operation of the apparatus 100 for measuring particulate matter.

Once air is introduced into the air inflow device 110, the processor 140 may control the light source 120 to simultaneously or sequentially emit two or more light beams having different wavelengths to the air. Driving conditions of each light source of the light source 120 may be predetermined, including an emission time, a driving sequence, a current intensity, a pulse duration, and the like. By referring to the light source driving conditions, the processor 140 may control driving of each light source of the light source 120.

By analyzing scattering patterns for each wavelength, for example, the back scattering pattern and the forward scattering pattern for each wavelength, which are measured by the pattern measuring device 130, the processor 140 may determine the size and the concentration of particles of particulate matter. In this case, the processor 140 may use a particulate matter estimation model that defines the size and the concentration of particulate matter particles, which correspond to the scattering patterns for each wavelength of light. The particulate matter estimation model may be obtained by experiments previously carried out on air, in which particles of various sizes are mixed in various concentrations.

The processor 140 may provide a user with the determined size and concentration of particulate matter particles by using an output interface, or may generate a histogram, indicating a concentration for each particle size, based on the determined size and concentration and may provide the generated histogram for the user.

If the concentration of particular matter particles exceeds a predetermined threshold, the processor 140 may generate a warning signal and may provide a user with the warning signal by using an output interface. For example, if the concentration of particular matter particles having a specific size exceeds a predetermined threshold, or if a total concentration of the particular matter particles exceeds a predetermined threshold, the processor 140 may generate a warning signal and may provide the warning signal for the user.

A method of obtaining the particulate matter estimation model will be described below in further detail.

For example, in order to determine the concentration of particular matter particles having five different sizes, a scattering pattern for each of two wavelengths of light may be obtained from air, in which particles of five different sizes are mixed in various concentrations, by using the apparatus for measuring particulate matter described above with reference to FIGS. 1 and 2. For example, for air, in which particulate matter particles of sizes of PM1, PM2, PM3, PM4, and PM5 are mixed in concentrations of C1, C2, C3, C4, and C5 respectively, scattering patterns for each wavelength of light, for example, the back scattering pattern and the forward scattering pattern for a first wavelength, and the back scattering pattern and the forward scattering pattern for a second wavelength, may be obtained. The obtained scattering patterns for each wavelength of light may be stored by mapping the scattering patterns to the sizes of the particles and the concentrations for the respective sizes. Then, by repeatedly measuring scattering patterns for each wavelength of light by changing each of the concentrations of the particles having the sizes of PM1, PM2, PM3, PM4, and PM5, the scattering patterns for each wavelength of light may be obtained from air, in which the particles of five different sizes are mixed in various concentrations.

By learning the sizes of particles of particular matter and the concentrations for the respective sizes, as well as the scattering patterns corresponding to the sizes and the concentrations, the particulate matter estimation model may be obtained. The particular matter estimation model may determine a concentration for each size of particles having five different sizes, by using the scattering patterns for each wavelength as an input. In this case, regression analysis, machine learning, and the like may be used as a learning algorithm.

The above description is given of an example of generating a particulate matter estimation model for determining the concentration of particles having five different sizes, but embodiments are not limited thereto, and there is no specific limitation on the size and the number of particulate matter particles which may be determined by using the particulate matter estimation model.

Figure 5:
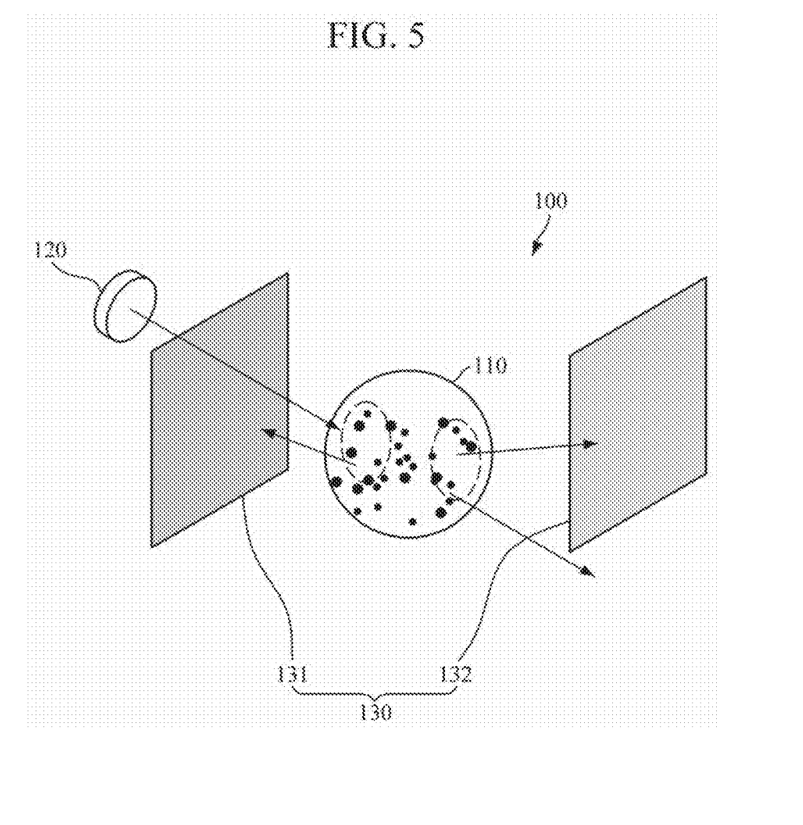
FIG. 5 is a diagram illustrating another example of a structure of an apparatus for measuring particulate matter according to an example embodiment.

FIG. 5 is a diagram illustrating another example of a structure of an apparatus for measuring particulate matter according to another example embodiment.

Referring to FIG. 5, the light source 120 may be disposed outside of the first detector 131, and the second detector 132 may be disposed at a position which is not affected by light emitted by the light source 120 and transmitted through air. In this case, the first detector 131 and the second detector 132 may be disposed to face each other.

Further, as described above, in order to prevent or reduce the light source 120 from directly emitting light to the first detector 131 and the second detector 132, the light source 120, the first detector 131, and the second detector 132 may include a structure such as a baffle, and the like.

Figure 6:
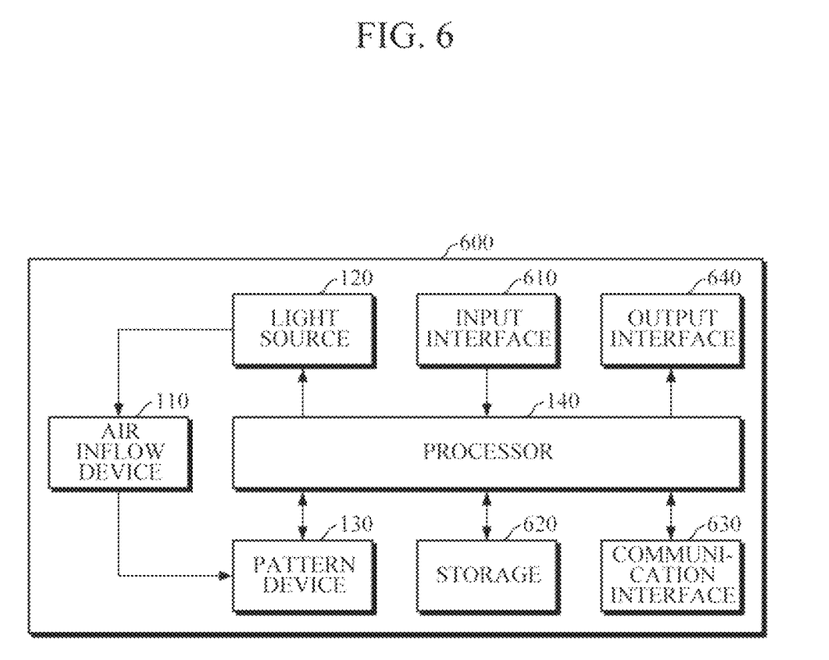
FIG. 6 is a block diagram illustrating another example of an apparatus for measuring particulate matter according to an example embodiment.

FIG. 6 is a block diagram illustrating another example of an apparatus for measuring particulate matter according to another example embodiment.

Referring to FIG. 6, the apparatus 600 for measuring particulate matter includes the air inflow device 110, the light source 120, the pattern measuring device 130, the processor 140, an input interface 610, a storage 620, a communication interface 630, and an output interface 640. Here, the air inflow device 110, the light source 120, the pattern measuring device 130, the processor 140 are described above with reference to FIGS. 1 to 5, such that detailed description thereof will be omitted.

The input interface 610 may receive input of various operation signals from a user. In an example embodiment, the input interface 610 may include a keypad, a dome switch, a static pressure or capacitance touch pad, a jog wheel, a jog switch, a hardware (H/W) button, and the like. The touch pad, which forms a layer structure with a display, may be a touch screen.

The storage 620 may store programs or commands for operation of the apparatus 600 for measuring particulate matter, and may store data input to and processed by the apparatus 600 for measuring particulate matter.

The storage 620 may include at least one storage medium of a flash memory type memory, a hard disk type memory, a multimedia card micro type memory, a card type memory, for example, an SD memory, an XD memory, and the like, a random access memory (RAM), a static random access memory (SRAM), a read only memory (ROM), an electrically erasable programmable read only memory (EEPROM), a programmable read only memory (PROM), a magnetic memory, a magnetic disk, and an optical disk, and the like. Further, the apparatus 600 for measuring particulate matter may operate an external storage medium, such as web storage and the like, which performs a storage function of the storage 620 on the Internet.

The communication interface 630 may communicate with an external device. For example, the communication interface 630 may transmit, to the external device, the data input to the apparatus 600 for measuring particulate matter, and data stored in and processed by the apparatus 600 for measuring particulate matter, and the like, or may receive, from the external device, various data useful for determining the size and the concentration of particulate matter particles.

In this case, the external device may be medical equipment using the data input to the apparatus 600 for measuring particulate matter, the data stored in and processed by the apparatus 600 for measuring particulate matter, and the like, a printer to print out results, or a display to display the results. In addition, the external device may be a digital television (TV), a desktop computer, a cellular phone, a smartphone, a tablet personal computer (PC), a laptop computer, a personal digital assistant (PDA), a portable multimedia player (PMP), a navigation device, an MP3 player, a digital camera, a wearable device, and the like, but is not limited thereto.

The communication interface 630 may communicate with an external device by using Bluetooth communication, Bluetooth Low Energy (BLE) communication, near field communication (NFC), WLAN communication, Zigbee communication, infrared data association (IrDA) communication, Wi-Fi Direct (WFD) communication, ultra-wideband (UWB) communication, Ant+ communication, WIFI communication, radio frequency identification (RFID) communication, 3G communication, 4G communication, 5G communication, and the like. However, embodiments are not limited thereto.

The output interface 640 may output the data input to the apparatus 600 for measuring particulate matter, the data stored in and processed by the apparatus 600 for measuring particulate matter, and the like. In an example embodiment, the output interface 640 may output the data input to the apparatus 600 for measuring particulate matter, the data stored in and processed by the apparatus 600 for measuring particulate matter, and the like by using at least one of an acoustic method, a visual method, and a tactile method. For example, the output interface 640 may include a display, a speaker, a vibrator, and the like.

Figure 7:
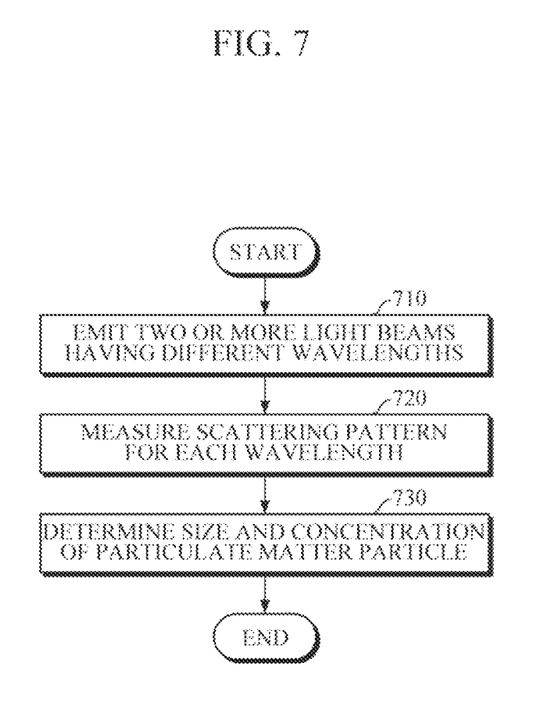
FIG. 7 is a flowchart illustrating an example of a method of measuring particulate matter according to an example embodiment.

FIG. 7 is a flowchart illustrating an example of a method of measuring particulate matter according to an example embodiment. The method of measuring particulate matter of FIG. 7 may be performed by the apparatus 100 or 600 for measuring particulate matter of FIG. 1 or FIG. 6.

Referring to FIG. 7, once air containing particulate matter particles is introduced into the air inflow device, the apparatus for measuring particulate matter may emit two or more light beams, having different wavelengths, to the introduced air (710). In this case, the two or more light beams having different wavelengths may be light having wavelengths in different wavelength bands. The different wavelength bands may be separated from each other by a sufficient wavelength spacing, such that various sizes of particulate matter may be measured, and the wavelength bands may be a near-infrared wavelength band, a visible wavelength band, and an infrared wavelength band. For example, the apparatus for measuring particulate matter may emit first light, having a wavelength in a near-infrared wavelength band, and may emit second light, having a wavelength in an infrared wavelength band or a visible wavelength band, to the introduced air. In this case, for example, the first light may be light having a wavelength of 0.405 µm, and the second light may be light having a wavelength of 0.85 µm. However, embodiment are not limited thereto.

The apparatus for measuring particulate matter may measure scattering patterns for each wavelength of light by detecting light forward-scattered and back-scattered by particles of particulate matter (720). For example, the apparatus for measuring particulate matter may measure back scattering patterns for each wavelength of light by detecting the first light and the second light, which are back-scattered by the particulate matter particles, and may measure forward scattering patterns for each wavelength of light by detecting the first light and the second light, which are forward-scattered by the particulate matter particles.

By analyzing the measured scattering patterns for each wavelength, for example, the back scattering pattern and the forward scattering pattern for each wavelength of light, the apparatus for measuring particulate matter may determine the size and the concentration of particulate matter particles (730). In this case, the apparatus for measuring particulate matter may use a particulate matter estimation model that defines the size and the concentration of particulate matter particles, which correspond to the scattering patterns for each wavelength of light. The particulate matter estimation model may be obtained by experiments previously carried out on air, in which particles of various sizes are mixed in various concentrations.

Light scattering by particles may vary depending on the wavelength of light and the size of particles. More specifically, Rayleigh scattering occurs when the particle size is much smaller than the wavelength of light, and Mie scattering occurs when the particle size is similar to or greater than the wavelength of light.

As described above with reference to FIG. 3, Mie scattering is an anisotropic scattering as shown on the left, and Rayleigh scattering is an isotropic scattering as shown on the right. That is, in Rayleigh scattering, light is scattered in all directions, and in Mie scattering, light is scattered forward, in the direction the light travels. Further, as the size of the particles increases, these characteristics of light scattering are more clearly observed. In Rayleigh scattering, the intensity of the scattered light is inversely proportional to the wavelength to the fourth power. Accordingly, the scattering becomes more intense at shorter wavelengths. In Mie scattering, the intensity of the scattered light is not inversely proportional to the wavelength to the fourth power, and isotropy is broken, such that scattering may occur significantly in a specific direction.

As isotropic Rayleigh scattering and anisotropic Mie scattering occur depending on the light wavelength and the particle size, the size of particles causing scattering may be estimated by analyzing such scattering patterns.

Figure 8:
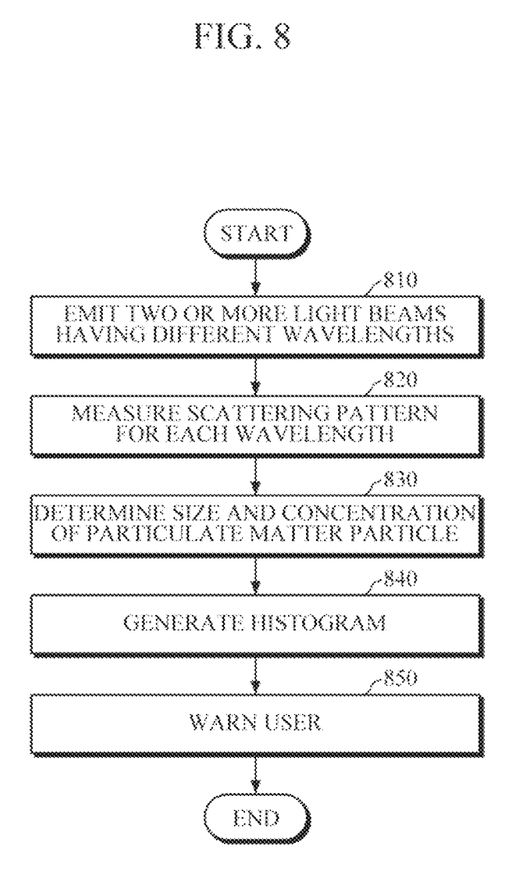
FIG. 8 is a flowchart illustrating another example of a method of measuring particulate matter according to an example embodiment.

FIG. 8 is a flowchart illustrating another example of a method of measuring particulate matter according to another example embodiment.

The method of measuring particulate matter of FIG. 8 may be performed by the apparatus 100 or 600 for measuring particulate matter of FIG. 1 or FIG. 6.

Referring to FIG. 8, once air containing particulate matter particles is introduced into the air inflow device, the apparatus for measuring particulate matter may emit two or more light beams, having different wavelengths, to the introduced air (810). In this case, the two or more light beams having different wavelengths may be light having wavelengths in different wavelength bands. The different wavelength bands may be separated from each other by a sufficient wavelength spacing, such that various sizes of particulate matter may be measured, and the wavelength bands may be a near-infrared wavelength band, a visible wavelength band, and an infrared wavelength band. For example, the apparatus for measuring particulate matter may emit first light having a wavelength in a near-infrared wavelength band, and may emit second light having a wavelength in an infrared wavelength band or a visible wavelength band. In this case, the first light may be light having a wavelength of 0.405 μm, and the second light may be light having a wavelength of 0.85 μm. However, embodiments are not limited thereto.

The apparatus for measuring particulate matter may measure scattering patterns for each wavelength of light by detecting light forward-scattered and back-scattered by particles of particulate matter (820). For example, the apparatus for measuring particulate matter may measure back scattering patterns for each wavelength of light by detecting the first light and the second light, which are back-scattered by the particulate matter particles, and may measure forward scattering patterns for each wavelength of light by detecting the first light and the second light, which are forward-scattered by the particulate matter particles.

By analyzing the measured scattering patterns for each wavelength, for example, the back scattering pattern and the forward scattering pattern for each wavelength of light, the apparatus for measuring particulate matter may determine the size and the concentration of particulate matter particles (830). In this case, the apparatus for measuring particulate matter may use a particulate matter estimation model that defines the size and the concentration of particulate matter particles, which correspond to the scattering patterns for each wavelength of light. The particulate matter estimation model may be obtained by experiments previously carried out on air, in which particles of various sizes are mixed in various concentrations.

The apparatus for measuring particulate matter may generate a histogram, indicating a concentration for each particle size, based on the determined size and concentration and may provide the generated histogram for the user (840).

If the concentration of particular matter particles exceeds a predetermined threshold, the apparatus for measuring particulate matter may warn a user (850). For example, if the concentration of particular matter particles having a specific size exceeds a predetermined threshold, or if a total concentration of particular matter particles exceeds a predetermined threshold, the apparatus for measuring particulate matter may generate a warning signal and may provide the warning signal for a user.

The present disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave, for example, data transmission through the Internet. The computer-readable recording medium can be distributed over a plurality of computer systems connected to a network so that a computer-readable code is written thereto and executed therefrom in a decentralized manner. Functional programs, codes, and code segments needed for realizing the present invention can be easily deduced by one of ordinary skill in the art.

While example embodiments have been described with reference to the figures, it will be understood by those of ordinary skill in the art that various changes in form and details may be made therein without departing from the spirit and scope of the present disclosure as defined by the following claim.

What is claimed is:

1. An apparatus for measuring particulate matter, the apparatus comprising:
   an air inflow device configured to receive air comprising particulate matter particles;
   two or more light sources configured to respectively emit light of different wavelengths to the air received;
   a pattern measuring device configured to measure scattering patterns for each wavelength of light based on detecting light that is forward-scattered by the particulate matter particles and light that is back-scattered by the particulate matter particles, the pattern measuring device comprising a first detector configured to detect the back-scattered light; and
   a processor configured to obtain a size of the particulate matter particles and a concentration of the particulate matter particles based on the scattering patterns for each wavelength of light,
   wherein the two or more light sources and the first detector are provided on a same side with respect to the air inflow device and the two or more light sources are disposed at a center of the first detector.

2. The apparatus of claim 1, wherein the processor is further configured to obtain the size of the particulate matter particles and the concentration of the particulate matter particles based on a particulate matter estimation model that defines the size of the particulate matter particles and the concentration of the particulate matter particles that corresponds to the scattering patterns for each wavelength of light.

3. The apparatus of claim 1, wherein the two or more light sources comprise:
   a first light source configured to emit first light in a near-infrared wavelength band; and
   a second light source configured to emit second light in an infrared wavelength band or a visible wavelength band.

4. The apparatus of claim 1, wherein the pattern measuring device further comprises:
   a second detector configured to detect the forward-scattered light.

5. The apparatus of claim 4, wherein each of the first detector and the second detector are configured to detect light of two or more wavelengths.

6. The apparatus of claim 5, wherein each of the first detector and the second detector is a multispectral light receiving device or hyperspectral light receiving device.

7. The apparatus of claim 5, wherein each of the first detector and the second detector is a light receiving device made of a wide band gap material.

8. The apparatus of claim 4, wherein the first detector and the second detector are disposed to face each other.

9. The apparatus of claim 4, wherein the second detector comprises an outlet through which light transmitted through the air exits.

10. The apparatus of claim 1, wherein the processor is configured to generate a histogram, indicating a concentration for each particle size, based on the obtained size of the particulate matter particles and the concentration of the particulate matter particles.

11. The apparatus of claim 1, wherein the processor is configured to provide a warning to a user through an output interface based on the concentration of the particulate matter particles exceeding a threshold.

12. The apparatus of claim 1, further comprising a display configured to display the size of the particulate matter particles and the concentration of the particulate matter particles.

13. A method of measuring particulate matter, the method comprising:
    receiving, by an air inflow device, air comprising particulate matter particles;
    emitting, by two or more light sources, two or more light beams having different wavelengths to the air comprising the particulate matter particles;
    measuring scattering patterns for each wavelength of light based on detecting light that is forward-scattered by the particulate matter particles and light that is back-scattered by the particulate matter particles; and
    determining a size of the particulate matter particles and a concentration of the particulate matter particles based on the scattering patterns measured for each wavelength of light,
    wherein the measuring of the scattering patterns for each wavelength of light comprises detecting the back-scattered light comprising two or more wavelengths of light by a first detector, and
    wherein the two or more light sources and the first detector are provided on a same side with respect to the air inflow device and the two or more light sources are disposed at a center of the first detector.

14. The method of claim 13, wherein the determining of the size of the particulate matter particles and the concentration of the particulate matter particles comprises determining the size of the particulate matter particles and the concentration of the particulate matter particles based on a particulate matter estimation model that defines the size of the particulate matter particles and the concentration of the particulate matter particles that corresponds to the scattering patterns for each wavelength of light.

15. The method of claim 13, wherein the two or more light beams having different wavelengths comprise first light in a near-infrared wavelength band, and second light in an infrared wavelength band or a visible wavelength band.

16. The method of claim 13, wherein the measuring of the scattering patterns for each wavelength of light further comprises:
    detecting the forward-scattered light comprising the two or more wavelengths of light by a second detector.

17. The method of claim 16, wherein each of the first detector and the second detector is a multispectral light receiving device or hyperspectral light receiving device.

18. The method of claim 16, wherein each of the first detector and the second detector is a light receiving device made of a wide band gap material.

19. The method of claim 16, wherein the first detector and the second detector are disposed to face each other.

20. The method of claim 13, further comprising generating a histogram, indicating a concentration for each particle size, based on the size of the particulate matter particles and the concentration of the particulate matter particles.

21. The method of claim 13, further comprising, providing a warning to a user based on a concentration of the particulate matter particles exceeding a threshold.

22. An apparatus for measuring particulate matter, the apparatus comprising:
    an air inflow device configured to receive air comprising particulate matter particles;
    a first light source configured to emit first light in a first wavelength band to the air comprising the particulate matter particles;
    a second light source configured to emit second light in a second wavelength band to the air comprising the particulate matter particles;
    a first detector configured to measure a back scattering pattern for each wavelength of light by detecting the first light that is back-scattered by the particulate matter particles and the second light that is back-scattered by the particulate matter particles;
    a second detector configured to measure a forward scattering pattern for each wavelength of light by detecting the first light forward-scattered by the particulate matter particles and the second light that is forward-scattered by the particulate matter particles; and
    a processor configured to determine a size of the particulate matter particles and a concentration of the particulate matter particles based on the back scattering pattern for each wavelength of light and the forward scattering pattern for each wavelength of light,
    wherein the first light source, the second light source, and the first detector are provided on a same side with respect to the air inflow device and the first light source and the second light source are disposed at a center of the first detector.

23. The apparatus of claim 22, wherein the processor is further configured to determine the size of the particulate matter particles and the concentration of the particulate matter particles based on a particulate matter estimation model that defines the size of the particulate matter particles and the concentration of the particulate matter particles that corresponds to the back scattering pattern for each wavelength of light and the forward scattering pattern for each wavelength of light.

24. The apparatus of claim 22, wherein the first wavelength band is a near-infrared wavelength band, and the second wavelength band is an infrared wavelength band or a visible wavelength band.

25. The apparatus of claim 22, wherein each of the first detector and the second detector is a multispectral light receiving device or hyperspectral light receiving device.

26. The apparatus of claim 22, wherein each of the first detector and the second detector is a light receiving device made of a wide band gap material.

27. The apparatus of claim 22, wherein the first detector and the second detector are disposed to face each other.

28. The apparatus of claim 22, wherein the second detector further comprises an outlet through which light transmitted through the air exits.

29. The apparatus of claim 22, wherein the processor is further configured to generate a histogram, indicating a concentration for each particle size, based on the determined size of the particulate matter particles and the determined concentration of the particulate matter particles.

30. The apparatus of claim 22, wherein the processor is configured to provide a warning to a user based on a concentration of the particulate matter particles exceeding a threshold.

* * * * *